United States Patent [19]

Groos

[11] Patent Number: 5,140,125
[45] Date of Patent: Aug. 18, 1992

[54] WIRE-ELECTRODE ARRANGEMENT FOR SPARK-EROSIVE CUTTING

[75] Inventor: Heinrich Groos, Herborn, Fed. Rep. of Germany

[73] Assignee: Berkenhoff GmbH, Heuchelheim, Fed. Rep. of Germany

[21] Appl. No.: 629,236

[22] Filed: Dec. 18, 1990

[30] Foreign Application Priority Data

Dec. 22, 1989 [DE] Fed. Rep. of Germany ....... 3942604

[51] Int. Cl.⁵ ............................................. B23H 7/08
[52] U.S. Cl. ................................. 219/69.12; 219/69.15
[58] Field of Search ............... 219/69.15, 69.12, 69.17, 219/69.14

[56] References Cited

U.S. PATENT DOCUMENTS

| 4,013,863 | 3/1977 | van Osenbruggen et al. ... 219/69.17 |
| 4,103,137 | 7/1978 | Levitt et al. ..................... 219/69.12 |
| 4,766,280 | 8/1988 | Groos ................................. 219/69.12 |
| 4,797,526 | 1/1989 | Kiyoshi ............................. 219/69.12 |
| 4,803,326 | 2/1989 | Kiyoshi ............................. 219/69.12 |

FOREIGN PATENT DOCUMENTS

| 60-207721 | 10/1985 | Japan ................................. 219/69.12 |
| 61-136732 | 6/1986 | Japan ................................. 219/69.12 |
| 61-226227 | 10/1986 | Japan ................................. 219/69.12 |
| 1-222821 | 9/1989 | Japan ................................. 219/69.12 |

Primary Examiner—Geoffrey S. Evans
Attorney, Agent, or Firm—Flynn, Thiel, Boutell & Tanis

[57] ABSTRACT

A wire-electrode arrangement for effecting a spark-erosive cutting and a method for the manufacture of a wire electrode. In order to be able to cut non-conductive materials, a plus potential and also a minus potential can be applied to the electrode, since the wire electrode is formed by a first and a second electrode, which are insulated from one another and which extend substantially parallel to one another.

10 Claims, 4 Drawing Sheets

WIRE-ELECTRODE ARRANGEMENT FOR SPARK-EROSIVE CUTTING

FIELD OF THE INVENTION

The invention relates to a wire-electrode arrangement for effecting a spark-erosive cutting and to a method for the manufacture of the wire electrode.

BACKGROUND OF THE INVENTION

During the spark-erosive cutting of conducting materials the effect is utilized that between the electrode and the material to be cut exists a voltage potential leading to sparkovers which are used for the purpose of removing the material area to be cut. Such methods are known from the state of the art.

Since according to the common principles of spark-erosive cutting a potential must be applied to the workpiece, problems result, because of the basic principle, with workpieces which are not electrically conductive.

DE-PS 26 37 432 describes a method and an apparatus for cutting nonconducting or poorly conducting workpieces, for example diamonds. Two wire electrodes which are parallel to one another are hereby utilized. These are designed plate-shaped and their spacing is chosen such that a sparkover between the two electrodes occurs. The spark length is thereby controlled such that the nonconducting or poorly conducting material, which is to be cut, is eroded. This operation has the decisive advantage that a very exact guiding of the two electrodes is needed. This is particularly disadvantageous in view of the fact that the electrodes are designed as wire electrodes and must at all times be guided. Another disadvantage of this operation is that the available erosion path is only very short, since the sparkover occurs only between the two wire electrodes. If for structural reasons a wider cutting width or rather a greater spacing between the two electrodes is necessary, very high voltages must be applied in order to achieve the desired effect.

Another possibility for a solution to the basic problem, which solution is for example known from DE-PS 24 04 857, is to form a surface-active substance in the dielectric solution through a suitable preparation of the electrolytic solution, which dielectric solution results in a certain conductivity of the respective surface area and is supposed to effect a sparkover from the electrode to the nonconducting or poorly conducting workpiece. This operation requires a considerable effort in the preparation or the monitoring of the electrolytic solution and is thus not suited for many industrial uses.

The basic purpose of the invention is to provide a wire-electrode arrangement for facilitating the spark-erosive cutting and a method for the manufacture of the wire electrode, which with a simple design and a simple application enables the spark-erosive cutting of nonconducting materials.

This purpose is attained regarding the wire-electrode arrangement by using at least a first and at least a second electrode which are insulated from one another and extend substantially parallel to one another, which electrodes form the wire electrode.

The arrangement of the invention has a number of significant advantages. Since the invention uses only one single wire electrode, which is formed of the two individual electrodes, expensive guiding mechanisms are not needed so that the wire electrode can be used substantially on conventional and commercially available spark-erosion machines, which can easily be changed over for this purpose. Furthermore, the invention has the significant advantage that the spacing between the two individual electrodes is fixed and cannot be changed so that always the same conditions exist during the cutting operation. This is of a special importance in particular in view of the cutting speed and the applied electrical potentials.

Furthermore, it is advantageous according to the invention that the wire electrode can be designed in any desired manner so that an exact adaptation to the respective cutting conditions, for example the cutting speed and the cutting width, is possible.

Thus, the electrode arrangement of the invention has the possibility, without causing a short circuit between the two electrodes, of producing a sparkover between the two electrodes, with the help of which the nonconductive or poorly conductive material in the cutting area can be cut.

A favorable further development of the invention provides that the wire electrode has a twisted or helical design. The twisting of the wire electrode has the advantage that particles are moved out of the cutting gap so that uncontaminated dielectric can at all times flow into the area of the cutting operation. This results, in particular in the case of very narrow working gaps, in a significant increase of the cutting speed and of the quality of the cut. A further advantage of the twisting is that with a longitudinal movement of the electrode the sparkover area changes its position and is rotated in the cutting gap in relationship to the workpiece which is not moving. In this manner, it is assured according to the invention that the cut occurs in a uniform manner over the entire cutting gap. An important increase in the cutting quality can also be achieved with this measure.

In order to enable a carefully directed application of the electrical potential, which application meets the requisites, the invention provides that the wire electrode is electrically connected to the voltage source of the spark-erosion machine through at least two sliding contacts which are insulated from one another. The sliding contacts are thereby arranged such that one sliding contact is in contact with the electrode or the electrodes loaded with the same potential. The sliding contact can in the case of a noncoiled wire electrode be associated with the electrode by a suitable alignment and positioning of the electrode, whereas in the case of a twisted or helically extending electrode a rotatable support of the sliding contact may be preferred in order to apply, according to the invention, a plus potential to the one sliding contact and a minus potential to the other sliding contact.

The principle solution provided by the invention enables many modifications in the design of the wire electrodes. A first possibility of a modified embodiment provides for the first electrode to be centrally arranged and having at least one side surface on which the second electrode is arranged. The first electrode can thereby be loaded with a plus potential, while the minus potential is applied to the second electrode. The wire electrode can thereby be designed such that the first, central electrode is not insulated, whereas the one or the several second electrodes are insulated from the first electrode. The insulation of the second electrode is thereby chosen such that a direct short circuit between the two electrodes is avoided and that the spark length is determined such by the dielectric that a removal of the nonconductive or poorly conductive materials occurs.

As an alternative to the above-described exemplary embodiment, it can also be particularly advantageous when the wire electrode includes a central insulator on the outside of which are arranged the first and the second electrode. The central insulator can for example be formed by connecting two electrode wires which are provided with insulation. However, it is also possible to insulate only one of the electrode wires, while the other electrode wire is designed as a blank wire. It is then necessary to connect the two wires in a suitable manner, for example by an adhesive.

In order to assure for a twisted or helically extending wire electrode a secure engagement of the sliding contacts with the respective electrode areas, the invention provides that the respective wire electrodes be profiled for the form-closed engagement with the sliding contact. The electrodes can for example have a prismatic cross section. However, it is also possible to design them semicircularly and to provide them with a longitudinal groove into which the sliding contact is received. The cross sections of the wire electrodes can thereby be chosen such that the respective twisting can be taken into consideration and that in particular a rotary movement of the sliding contacts is assured. The profiling of the wire electrode can thereby be adapted to the forces to be transmitted onto the sliding contact so that a separate drive for rotating the sliding contact when using a twisted or helically extending wire electrode may not be necessary. The profiling can in the same manner be advantageous for a noncoiled wire electrode.

Regarding the method, the basic purpose is attained by an insulated wire forming the first electrode being profiled in a first embodiment, by the second electrode being introduced in the form of an insulated wire into the coil or helix during the coiling operation of the profiled wire, and by areas of the insulating layer of the second electrode being removed during a subsequent passage through a wire shaving nozzle. Thus, it is for example possible to utilize the insulated wire material in the form of an enameled wire of copper, Ne-metal alloys, iron and steel or other conductive material. The electrode wire is profiled for example by rolling or drawing with the enameled layer not being damaged when conventional methods are used. One or two additional bare noninsulated wires are also introduced into the twist or helix during the twisting operation in dependency of the desired development of the electrode. The enameled layer on the outer contact or rather spark-discharge surface of the first electrode is again removed by means of the shaving nozzle so that a spark transfer between the individual electrodes is made possible. It is to be understood that the number of the individual wire electrodes both in this exemplary embodiment and also in the other exemplary embodiments can be chosen as desired in order to produce the desired spark lengths.

A further, preferred method development provides that several wires, of which at least one is insulated, are guided through a twisting or helical path, and that by means of a wire shaving nozzle the insulating layer is removed on the outer area of the wire electrodes. A central insulator is formed during this operation, which insulator consists of the two insulating layers of the individual insulated wires, which insulating layers rest on one another. It is thereby possible to use in a particularly economical manner enameled wires of a normal copper wire or corresponding wire. The design of the wire shaving nozzle makes it possible to remove the insulation or the enameled layer at specific peripheral areas of the wire electrode in order to create the desired discharge zones. In order to improve the engagement characteristic of the wire electrode with the corresponding sliding electrode and in order to safely guide the wire electrode, it can be advantageous that the wires are profiled before or after the twisting. Thus, it is for example possible to use segment wire or semicircular wires or to provide the wire with a prismatic cross section.

As an alternate to the last described operation, it is also possible to construct the wires as semicircular wires with at least one of the wires being insulated or rather enameled. It is thereby possibly advantageous to glue the two wires together, for example during an enameling method during a simultaneous heating up of the wires.

In a modification of the method, it can be advantageous when an insulated wire is twisted and a soft material with a low melting point is thereafter introduced into the helix formed by the twist. The respective outer surface of the wire electrode can be insulated here also by a wire shaving nozzle. The insulated wire can be for example a profiled wire having a temperature-resistant lacquer, plastic, Teflon or non-conducting aluminum oxide. The metal introduced into the helix can consist for example of lead, tin, zinc or corresponding alloys or can be produced through a suitable application method, as for example hot-tin plating and zinc plating or others.

Thus, the invention creates the possibility of eroding nonconducting materials, in particular ceramics. Of course, the man skilled in the art knows that the wire electrode of the invention can be designed of two or more individual wire-shaped electrodes. Furthermore, it is possible to design the wire electrode as a continuous electrode or as a laced electrode.

BRIEF DESCRIPTION OF THE DRAWINGS

The invention will be described hereinafter in connection with exemplary embodiments and the drawings, in which:

FIG. 2A is a cross-sectional view of the wire shown in FIG. 2;

DETAILED DESCRIPTION

Figure 1:
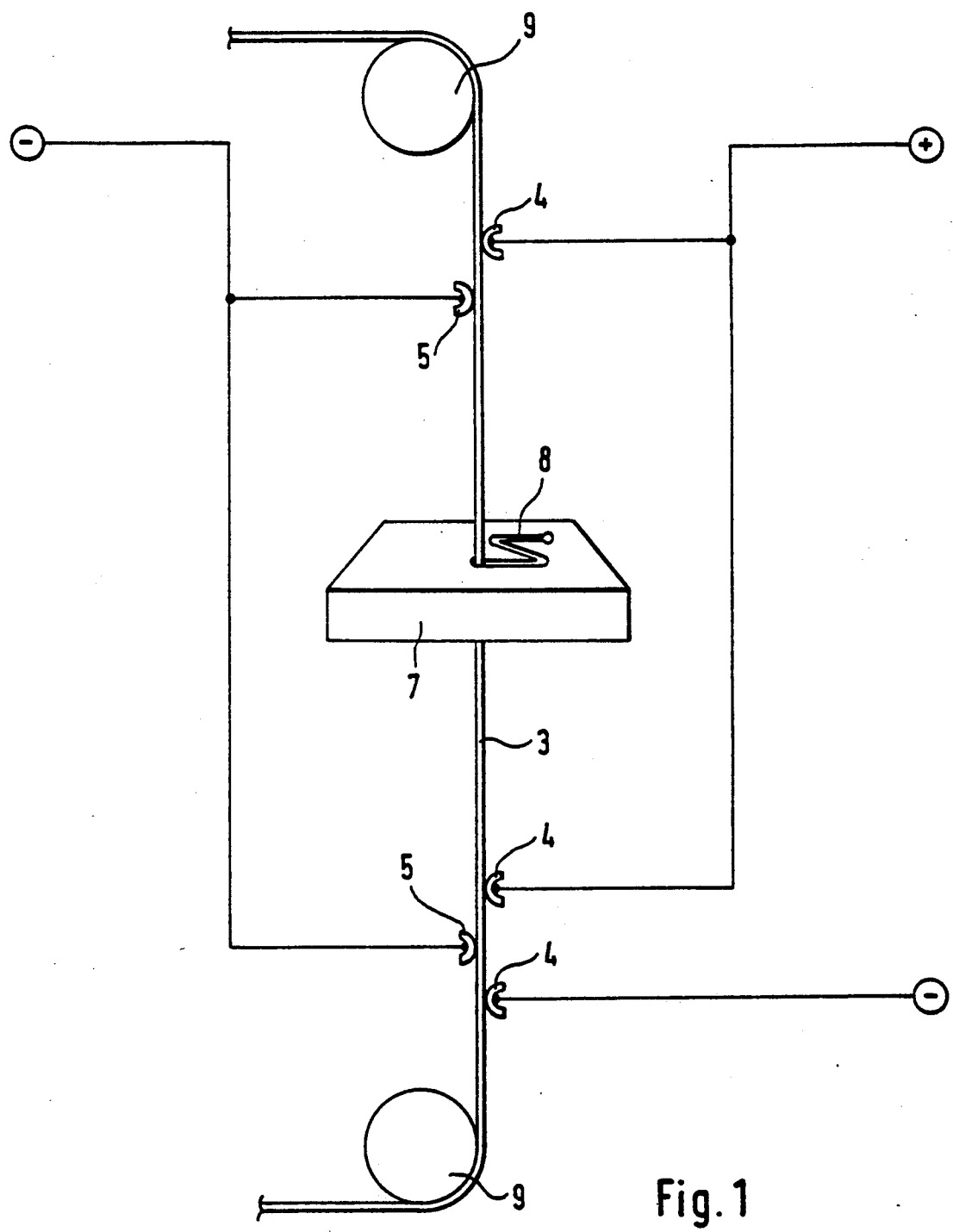
FIG. 1 is a schematic illustration of the spark-erosive cutting arrangement.

FIG. 1 shows a schematic illustration of the spark-erosion arrangement of the invention. It includes a workpiece 7 made of a nonconducting material and which has a cutting groove 8 therein. The entire arrangement is in the usual manner, at least in the spark-erosion area, arranged in a dielectric, as this is known from the state of the art. A wire electrode 3 is guided through the workpiece 7, which wire electrode 3 is guided in a manner not illustrated from a storage spool onto a wind-up spool. FIG. 1 shows of the entire wire guide system only the guide rollers 9.

Sliding contacts 4, 5 are provided in front of or rather after the workpiece 7 in the arrangement according to FIG. 1, by means of which sliding contacts the wire electrode 3, which will be described hereinafter, is to be connected to a plus potential or, and in the alternative, a minus potential. The sliding contacts 4 are used to provide the connection to the plus potential, while the sliding contacts 5 are used to provide the connection to the minus potential.

Figure 2:
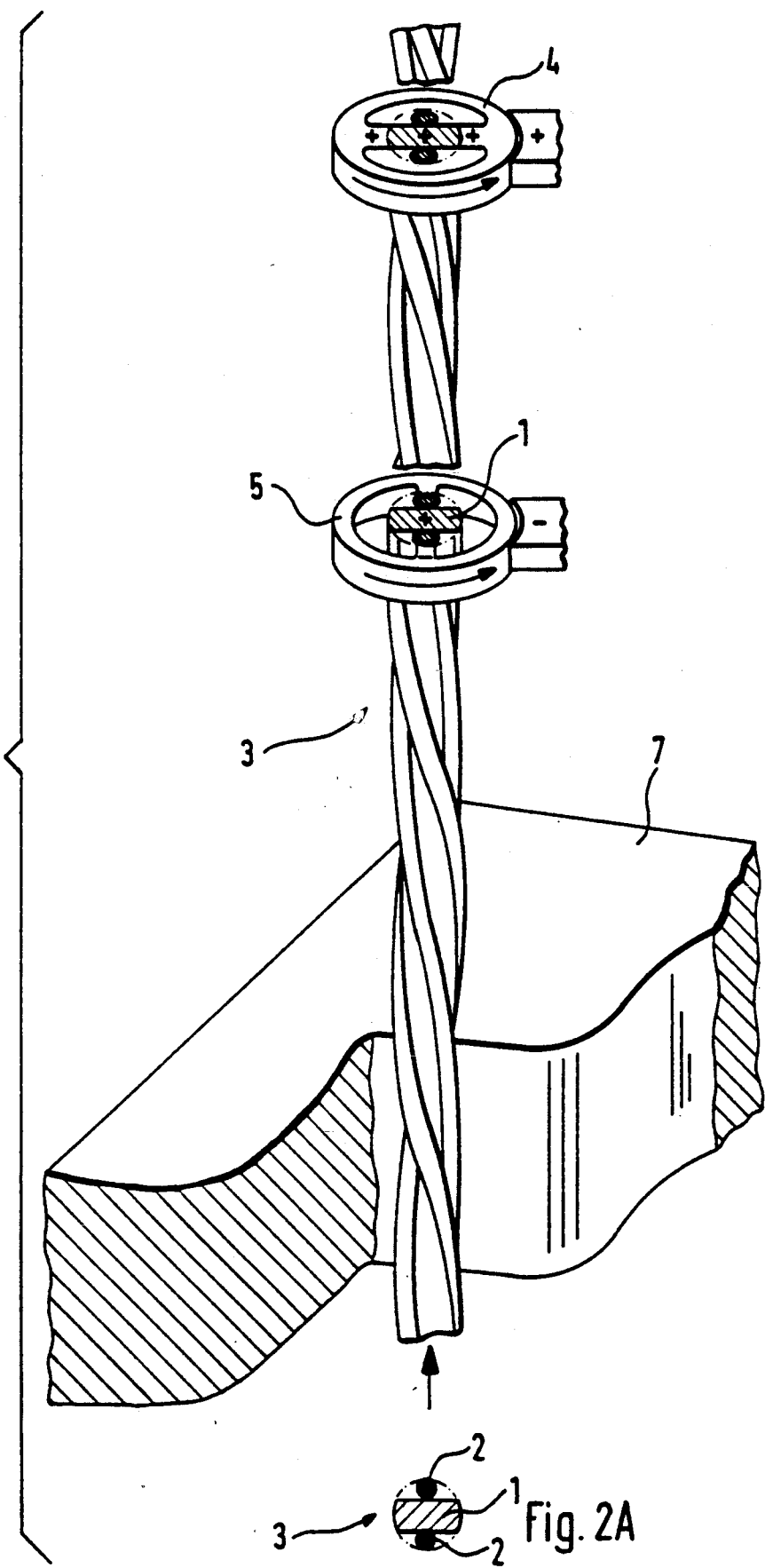
FIG. 2 is a schematic, perspective view of a first exemplary embodiment of the arrangement of the invention.

FIG. 2 shows an enlarged perspective illustration of a workpiece 7, partly in cross section, which is being cut by means of the wire electrode 3. FIG. 2A shows a cross section of the illustrated exemplary embodiment of the wire electrode 3. The design of the wire electrode will be discussed in detail hereinafter in connection with FIG. 4. The wire electrode includes a first electrode 1, which is centrally arranged. Second electrodes 2 are each provided on the two flanks of the electrode. The second electrodes 2 are insulated from the first electrode 1 by means of an insulating layer 10. The entire wire electrode 3 has a substantially circular cross section and is designed such that the insulating layer 10 of the second electrode 2 is removed on the outer peripheral area. A spark length can in this manner be created from the second electrode 2 to the bare, not insulated first electrode 1.

Figure 3:
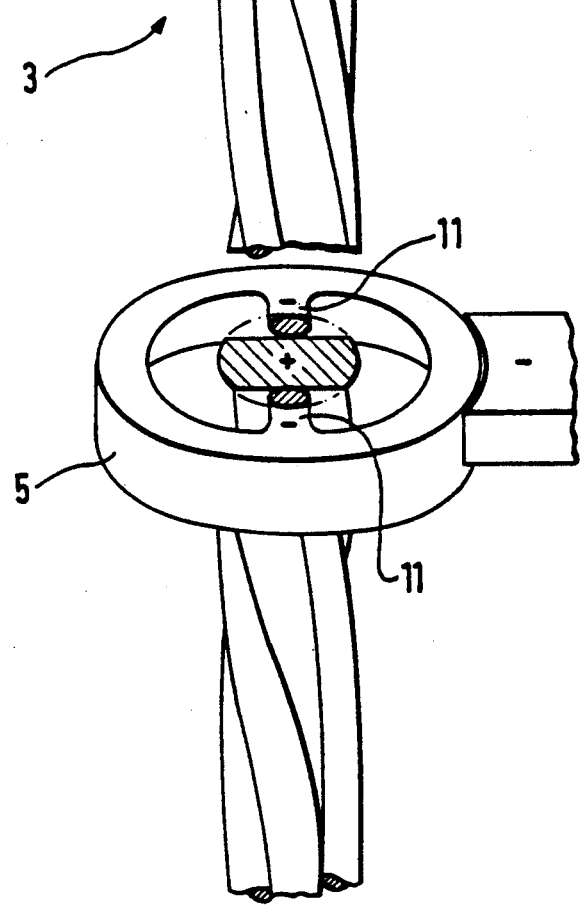
FIG. 3 is an enlarged illustration of the sliding contacts used in the arrangement according to FIG. 2.

FIG. 3 is an enlarged illustration of the design and of the arrangement of the wire electrode 3.

According to the invention, the possibility exists to use different materials for the first and the second electrode, which materials can be adapted with respect to their electrical characteristics, their wear resistancy and other values in an optimal manner to the requirements.

Figure 4:
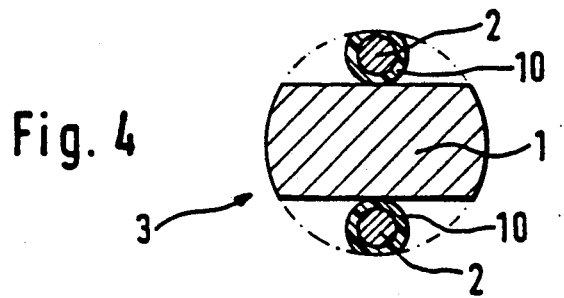
FIG. 4 is a cross-sectional view of an exemplary embodiment of the wire electrode of the invention with a central electrode.

To transmit the electrical potential, the exemplary embodiment of the wire electrode shown in FIGS. 2-4 illustrates an annular sliding contact 4, 5 enclosing the wire electrode 3 and having diametrically opposing, inwardly extending legs 11 adapted to the profiling of the wire electrode 3 and dimensioned such that they engage the first or rather the second electrode 1, 2. The sliding contact 4 illustrated in the upper area of FIG. 3 is used for the application of a plus potential, while the lower sliding contact 5 applies a minus potential. As indicated by the arrows in FIG. 2, the sliding contacts 4, 5 rotate in order to maintain during a longitudinal movement of the coiled or helical wire electrode 3 a contact with the respective electrode 1 or 2. To adapt the rotary movement of the sliding contact 4, 5, it is possible to profile the respective electrode or rather the sliding contact in order to assure a power transmission, as this is shown in the exemplary embodiments of FIGS. 5 and 6.

Figure 5:
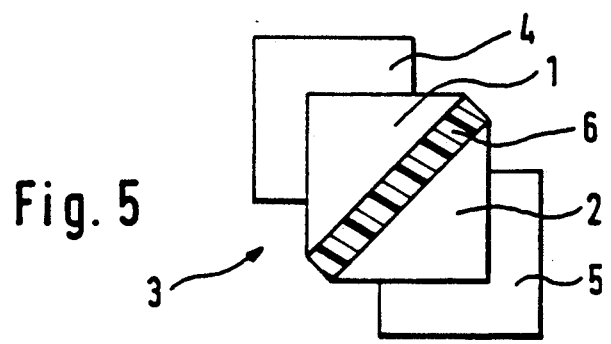
FIG. 5 is a cross-sectional view of an exemplary embodiment of the wire electrode of the invention illustrating the sliding contacts, with a central insulating member.
Figure 6:
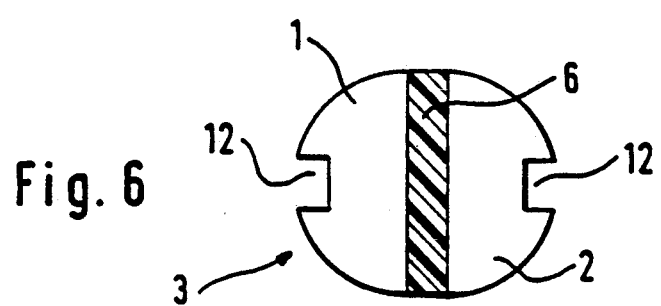
FIG. 6 is a cross-sectional view of a further modified development of the wire electrode of the invention.

FIGS. 5 and 6 each show exemplary embodiments of the wire electrode of the invention, in which a central insulator 6 is provided which electrically insulates the first electrode 1 from the second electrode 2. The two electrodes 1, 2 each have a profiled design, with the electrode of the exemplary embodiment of FIG. 5 having a prismatic or triangular cross section, while the electrode 1, 2 according to the exemplary embodiment of FIG. 6 having a semicircular cross section with a groove 12 in its apex. The groove 12 serves to facilitate the form-closed engagement with a correspondingly profiled sliding contact (not illustrated). The exemplary embodiment according to FIG. 5 shows a cross-sectional illustration of the sliding contacts 4, 5. The sliding contacts 4, 5 are designed angularly and enclose the outer surface of the electrode 1 or 2. It is to be understood that the sliding contacts 4, 5 illustrated in FIG. 5 form only a portion of the annular design, as it is shown in FIG. 3.

The invention is not to be limited to the illustrated exemplary embodiments. Rather many possibilities for modifications within the scope of the invention exist for the man skilled in the art.

The embodiments of the invention in which an exclusive property or privilege is claimed are defined as follows:

1. A wire-electrode arrangement for facilitating a spark-erosive cutting, comprising a first electrode means and a second electrode means united into a single elongated wire, the first and second electrodes extending substantially parallel to one another, and insulation means for insulating the first and second electrode means from one another.

2. The arrangement according to claim 1, wherein the wire electrode is twisted or helical in an axial direction thereof.

3. The arrangement according to claim 2, including at least two sliding contacts insulated from one another and being able to be brought into contact with a selected one of the first and second electrode means.

4. The arrangement according to claim 3, wherein a plus potential is applied to one of the sliding contacts and a minus potential to the other one of the sliding contacts.

5. The arrangement according to claim 1, wherein the first electrode means is a single, centrally arranged first electrode having side surfaces, and wherein the second electrode means includes plural second electrodes each arranged on opposing sides of the first electrode.

6. The arrangement according to claim 5, wherein a plus potential is applied to the first electrode and a minus potential to the second electrodes.

7. The arrangement according to claim 1, wherein the insulation means includes a central insulator, on the outer surfaces of which insulator are separately arranged the first electrode means and the second electrode means.

8. The arrangement according to claim 7, wherein the first and the second electrode means have a prismatic cross section.

9. The arrangement according to claim 7, wherein the first and the second electrode means have a semicircular cross section.

10. The arrangement according to claim 1, wherein the first and the second electrode means are profiled for the form-closed engagement with the sliding contact.

* * * * *